United States Patent
Chen et al.

(10) Patent No.: US 11,843,437 B2
(45) Date of Patent: Dec. 12, 2023

(54) SIGNAL TRANSMISSION METHOD, SIGNAL RECEPTION METHOD AND APPARATUSES THEREOF

(71) Applicant: FUJITSU LIMITED, Kawasaki (JP)

(72) Inventors: Zhe Chen, Beijing (CN); Lei Song, Beijing (CN); Lei Zhang, Beijing (CN); Xin Wang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 352 days.

(21) Appl. No.: 17/183,723

(22) Filed: Feb. 24, 2021

(65) Prior Publication Data

US 2021/0184749 A1 Jun. 17, 2021

Related U.S. Application Data

(63) Continuation of application No. PCT/CN2018/107718, filed on Sep. 26, 2018.

(51) Int. Cl.
*H04B 7/06* (2006.01)
*H04W 76/19* (2018.01)
(Continued)

(52) U.S. Cl.
CPC ........ *H04B 7/0695* (2013.01); *H04W 72/046* (2013.01); *H04W 72/0473* (2013.01);
(Continued)

(58) Field of Classification Search
CPC .... H04B 7/0695; H04W 76/19; H04W 76/11; H04W 76/27; H04W 76/23; H04W 72/046; H04W 72/0473; H04W 74/0833; H04W 80/02; H04W 36/0033; H04W 52/02; H04W 16/28; H04W 52/34
See application file for complete search history.

(56) References Cited

U.S. PATENT DOCUMENTS 10,848,230 B2    11/2020  Lu et al.
2017/0332207 A1*  11/2017  Sheng ............... H04W 4/027
(Continued)

FOREIGN PATENT DOCUMENTS

CN    108513737 A    9/2018
WO    2018/56789 A1  3/2018
(Continued)

OTHER PUBLICATIONS

"Remaining issues on beam failure recovery" Gothenburg, Sweden Aug. 20-24, 2018 (Year: 2018).*
(Continued)

*Primary Examiner* — Mewale A Ambaye
(74) *Attorney, Agent, or Firm* — Myers Wolin, LLC

(57) ABSTRACT

A signal transmission method, signal reception method and apparatuses thereof. A signal transmission apparatus. The apparatus includes a transmitter configured to, after a period of time of receiving a downlink signal related to beam failure recovery and before receiving or applying activation signaling or reconfiguration signaling, transmit an uplink signal in a first cell by using a spatial domain transmission filter identical to a spatial domain transmission filter transmitting an uplink signal related to beam failure recovery or receiving a downlink reference signal.

19 Claims, 6 Drawing Sheets

(51) Int. Cl.
| | | |
|---|---|---|
| H04W 76/11 | (2018.01) | |
| H04W 76/27 | (2018.01) | |
| H04W 72/044 | (2023.01) | |
| H04W 74/08 | (2009.01) | |
| H04W 80/02 | (2009.01) | |
| H04W 72/23 | (2023.01) | |

(52) U.S. Cl.
CPC ....... *H04W 72/23* (2023.01); *H04W 74/0833* (2013.01); *H04W 76/11* (2018.02); *H04W 76/19* (2018.02); *H04W 76/27* (2018.02); *H04W 80/02* (2013.01)

(56) References Cited

U.S. PATENT DOCUMENTS

| | | | |
|---|---|---|---|
| 2018/0206170 A1 | 7/2018 | Nagaraja et al. | |
| 2019/0190582 A1* | 6/2019 | Guo | H04L 1/0061 |
| 2019/0222277 A1* | 7/2019 | Park | H04L 5/0094 |
| 2020/0119799 A1* | 4/2020 | Jung | H04W 52/36 |
| 2020/0221485 A1* | 7/2020 | Cirik | H04L 25/0226 |
| 2020/0351129 A1* | 11/2020 | Kwak | H04W 72/53 |
| 2021/0385832 A1* | 12/2021 | Zhang | H04W 72/1263 |

FOREIGN PATENT DOCUMENTS

| | | | |
|---|---|---|---|
| WO | 2018059399 A1 | 4/2018 | |
| WO | 2018/136300 A1 | 7/2018 | |
| WO | 2018/148552 A1 | 8/2018 | |

OTHER PUBLICATIONS

Extended European search report with the supplementary European search report and the European search opinion issued by the European Patent Office for corresponding European Patent Application No. 18935975.5-1215, dated Oct. 11, 2021.
Decision of Refusal issued by the Japan Patent Office for corresponding Japanese Patent Application No. 2021-510183, dated Nov. 15, 2022, with an English translation.
The First Notification of Office Action and Search Report issued by the China National Intellectual Property Administration for corresponding Chinese Patent Application No. 201880096972.1, dated Sep. 8, 2021, with an English translation.
Notice of Reasons for Refusal issued by the Japan Patent Office for corresponding Japanese Patent Application No. 2021-510183, dated May 17, 2022, with an English translation.
NTT DOCOMO, "Remaining issues on beam management", Agenda Item: 7.1.2.3, 3GPP TSG-RAN WG1 Meeting #94, R1-1809138, Gothenburg, Sweden, Aug. 20-24, 2018.
Ericsson, "Multi-cell beam recovery", Agenda Item: 7.1.2.2.6, 3GPP TSG-RAN WG1 Meeting #92bis, R1-1804976, Sanya, China, Apr. 16-20, 2018.
Huawei et al., "Remaining issues on beam management and beam failure recovery", Agenda Item: 7.1.2.3, 3GPP TSG-RAN WG1 Meeting #94, R1-1808145, Gothenburg, Sweden, Aug. 20-24, 2018.
International Search Report and Written Opinion of the International Searching Authority issued by the State Intellectual Property Office of the P. R. China for International Patent Application No. PCT/CN2018/107718, dated Jun. 24, 2019, with an English translation.
Media Tek Inc., "Summary #2 on Remaining issues on Beam Failure Recovery", Agenda Item: 7.1.2.3, 3GPP TSG-RAN WG1 Meeting #94, R1-1809926, Gothenburg, Sweden, Aug. 20-24, 2018.
Sony, "Summary of SRS", Agenda Item: 7.1.2.4, 3GPP TSG-RAN WG1 Meeting #94, R1-1809814, Gothenburg, Sweden, Aug. 20-24, 2018.
Nokia et al, "Remaining issues on beam management", Agenda Item: 7.1.2.3, 3GPP TSG-RAN WG1 Meeting #94, R1-1809237, Gothenburg, Sweden, Aug. 20-24, 2018.
Examination Report issued by the Patent Office of India for corresponding Indian Patent Application No. 202137007348, dated Feb. 4, 2022, with an English translation.
Notice of Termination of Reconsideration by Examiner before Appeal Proceedings and Reconsideration Report by Examiner before Appeal issued by the Japan Patent Office for corresponding Japanese Patent Application No. 2021-510183, dated Apr. 25, 2023, with an English translation.
Zte, "Maintenance for beam management", Agenda Item: 7.1.2.3, 3GPP TSG-RAN WG1 Meeting#94, R1-1808196, Gothenburg, Sweden, Aug. 20-24, 2018.

* cited by examiner

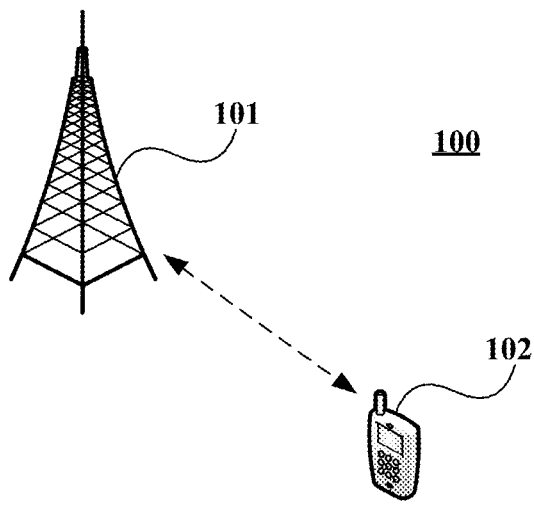

FIG. 1

After a period of time of receiving a downlink signal related to beam failure recovery and before receiving or applying activation signaling or reconfiguration signaling, an uplink signal in a first cell is transmitted by a terminal equipment by using a spatial domain transmission filter identical to a spatial domain transmission filter transmitting an uplink signal related to beam failure recovery or receiving a downlink reference signal

After a period of time of transmitting a downlink signal related to beam failure recovery and before transmitting activation signaling or reconfiguration signaling or applying activation signaling or reconfiguration signaling, an uplink signal in a first cell is received by a network device according to spatial information on receiving uplink signal related to beam failure recovery or transmitting a downlink reference signal

FIG. 5

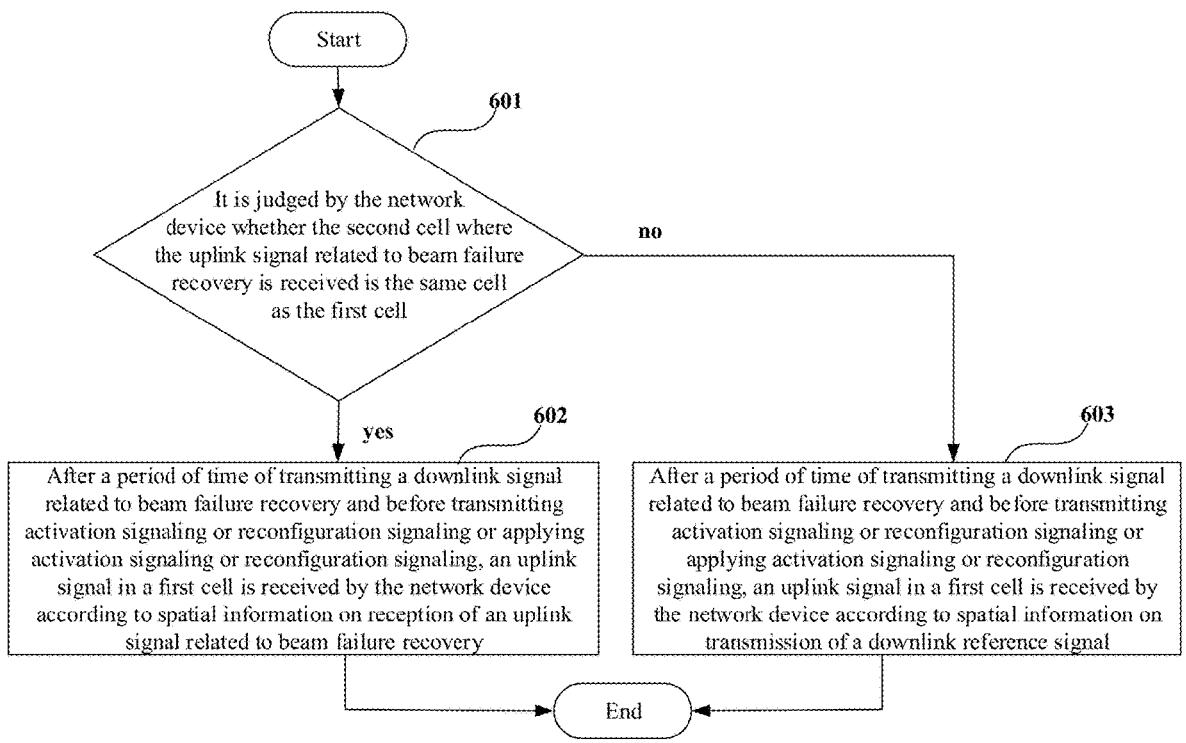

FIG. 6

SIGNAL TRANSMISSION METHOD, SIGNAL RECEPTION METHOD AND APPARATUSES THEREOF

CROSS-REFERENCE TO RELATED APPLICATION

This application is a continuation application of International Application PCT/CN2018/107718 filed on Sep. 26, 2018 and designated the U.S., the entire contents of which are incorporated herein by reference.

TECHNICAL FIELD

This disclosure relates to the field of communication technologies, and in particular to a signal transmission method, a signal reception method and apparatuses thereof.

BACKGROUND

In a high-frequency communication scenario, a communication link is susceptible to the impact of physical conditions, such as weather, obstacles, changes in directions and angles, and other factors, which may cause transmission failure in an original beam direction. A beam failure recovery (BFR) technique is mainly aimed at such a scenario in which measurement results of power of beams in different directions are used to quickly locate a new and reliable beam direction, thereby completing rapid recovery of the link.

The beam failure recovery technique is not only very effective in a single-carrier scenario, but also plays an important role in a multi-carrier scenario. In the multi-carrier scenario, a terminal equipment (TE) may be connected to one or more network devices (such as a base station). When different carriers of a terminal equipment are connected to network devices in different directions at the same time, as spatial directions are relatively independent, at a certain moment, beam failure may occur in only a part of the connections on different carriers. In this case, the beam failure recovery technique needs to be optimized for such a scenario, such as using a carrier where no beam failure occurs to perform parameter measurement, data transfer, etc., so as to improve robustness of the system.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

At present, in a 5G-NR (5G-New Radio) communication system, after a beam failure recovery process is successful, a spatial domain transmission filter used for uplink transmission is still the configured one before the beam failure recovery. Due to the reciprocity of uplink and downlink transmissions, after beam failure occurs in a downlink channel, it is very probable that a failure also occurs in a corresponding uplink channel. This means that it is unreliable for the terminal equipment to transmit uplink signals according to an previous spatial configuration.

Embodiments of this disclosure provide a signal transmission method, signal reception method and apparatuses thereof, in which after a period of time of receiving a downlink signal related to beam failure recovery and before receiving or applying the activation signaling or the reconfiguration signaling, a terminal equipment transmits an uplink signal in a first cell by using a spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). In a multi-carrier (multiple serving cells being configured) scenario, this solution may correctly indicate the spatial domain transmission filter used by the uplink signal of the first cell, and avoid incorrectly indicating the spatial domain transmission filter used by uplink signals of other cells (not the first cell).

Furthermore, this solution also accurately stipulates a starting point of the period of time, which avoids unnecessary errors in reception and transmission caused by inconsistent understanding of the period of time by the terminal equipment and the network device.

According to a first aspect of the embodiments of this disclosure, there is provided a signal transmission apparatus, including: a transmitting unit configured to, after a period of time of receiving a downlink signal related to beam failure recovery and before receiving or applying activation signaling or reconfiguration signaling, transmit an uplink signal in a first cell by using a spatial domain transmission filter identical to a spatial domain transmission filter transmitting an uplink signal related to beam failure recovery or receiving a downlink reference signal.

According to a second aspect of the embodiments of this disclosure, there is provided a signal reception apparatus, including: a receiving unit configured to, after a period of time of transmitting a downlink signal related to beam failure recovery and before transmitting activation signaling or reconfiguration signaling or applying activation signaling or reconfiguration signaling, receive an uplink signal in a first cell according to spatial information on receiving uplink signal related to beam failure recovery or transmitting a downlink reference signal.

According to a third aspect of the embodiments of this disclosure, there is provided a terminal equipment, including the apparatus as described in the first aspect of the embodiments of this disclosure.

According to a fourth aspect of the embodiments of this disclosure, there is provided a network device, including the apparatus as described in the second aspect of the embodiments of this disclosure.

According to a fifth aspect of the embodiments of this disclosure, there is provided a communication system, including the terminal equipment as described in the third aspect and the network device as described in the fourth aspect.

According to a sixth aspect of the embodiments of this disclosure, there is provided a signal transmission method, including: after a period of time of receiving a downlink signal related to beam failure recovery and before receiving or applying activation signaling or reconfiguration signaling, transmitting an uplink signal in a first cell by using a spatial domain transmission filter identical to a spatial domain transmission filter transmitting an uplink signal related to beam failure recovery or receiving a downlink reference signal.

According to a seventh aspect of the embodiments of this disclosure, there is provided a signal reception method, including: after a period of time of transmitting a downlink signal related to beam failure recovery and before transmitting activation signaling or reconfiguration signaling or applying activation signaling or reconfiguration signaling, receiving an uplink signal in a first cell according to spatial information on receiving uplink signal related to beam failure recovery or transmitting a downlink reference signal.

According to an eighth aspect of the embodiments of this disclosure, there is provided a computer readable program, which, when executed in a signal transmission apparatus or a terminal equipment, will cause the signal transmission apparatus or the terminal equipment to carry out the signal transmission method described in the sixth aspect of the embodiments of this disclosure.

According to a ninth aspect of the embodiments of this disclosure, there is provided a computer storage medium, including a computer readable program, which will cause a signal transmission apparatus or a terminal equipment to carry out the signal transmission method described in the sixth aspect of the embodiments of this disclosure.

According to a ten aspect of the embodiments of this disclosure, there is provided a computer readable program, which, when executed in a signal reception apparatus or a network device, will cause the signal reception apparatus or the network device to carry out the signal reception method described in the seventh aspect of the embodiments of this disclosure.

According to an eleventh aspect of the embodiments of this disclosure, there is provided a computer storage medium, including a computer readable program, which will cause a signal reception apparatus or a network device to carry out the signal reception method described in the seventh aspect of the embodiments of this disclosure.

An advantage of the embodiments of this disclosure exists in that after a period of time of receiving a downlink signal related to beam failure recovery and before receiving or applying activation signaling or reconfiguration signaling, the terminal equipment transmits an uplink signal in a first cell by using a spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell).

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 1 is a schematic diagram of a communication system of this disclosure;

FIG. 2 is a schematic diagram of the signal transmission method of Embodiment 1 of this disclosure;

FIG. 5 is a schematic diagram of the signal reception method of Embodiment 2 of this disclosure;

FIG. 6 is another schematic diagram of the signal reception method of Embodiment 2 of this disclosure;

DETAILED DESCRIPTION

Figure 3:
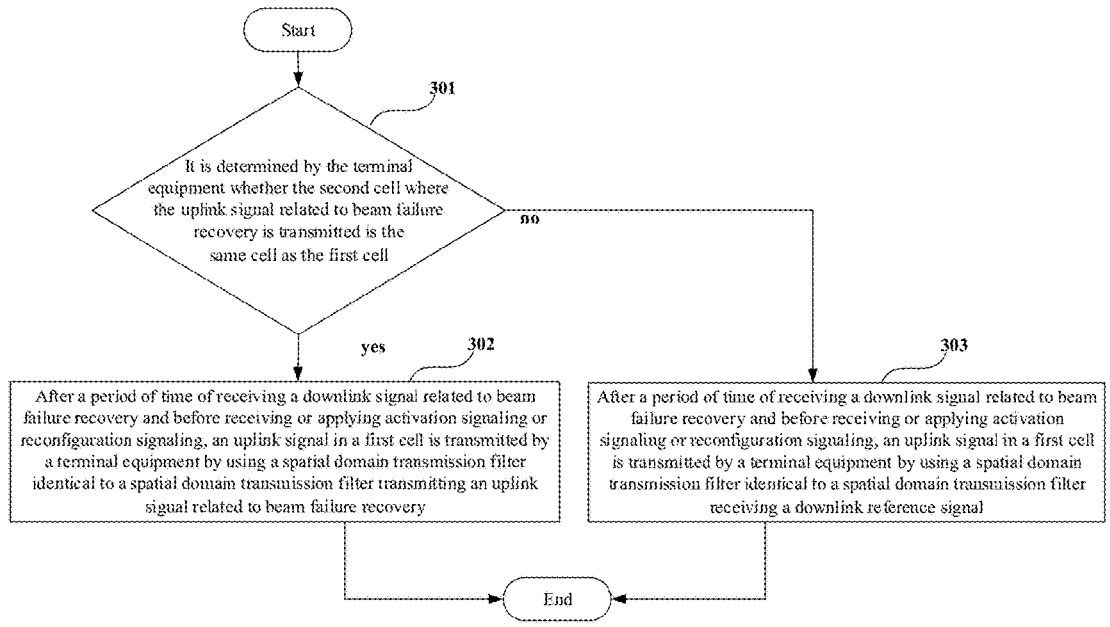
FIG. 3 is another schematic diagram of the signal transmission method of Embodiment 1 of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments, "multiple" or "multiple types" refers to at least two or at least two types.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

In the embodiments of this disclosure, the terminal equipment may include but not limited to the following devices: a cellular phone, a personal digital assistant (PDA), a wireless modem, a wireless communication device, a handheld device, a machine-type communication device, a laptop, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, a cell may be a serving cell, or may be a carrier which the cell corresponds, or a cell may be understood as corresponding to a carrier one by one.

In the embodiments of this disclosure, for a dual connectivity (DC) operation, a special cell refers to a primary cell (Pcell) in a master cell group (MCG) and a primary secondary cell (PSCell) in a secondary cell group (SCG); otherwise, the special cell refers to a primary cell.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, FIG. 1 is described by taking only one terminal equipment as an example; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

Embodiment 1

The embodiment of this disclosure provides a signal transmission method, applicable to a terminal equipment side.

FIG. 2 is a schematic diagram of the signal transmission method of Embodiment 1 of this disclosure. As shown in FIG. 2, the method includes:

Step 201: after a period of time of receiving a downlink signal related to beam failure recovery and before receiving or applying activation signaling or reconfiguration signaling, an uplink signal in a first cell is transmitted by a terminal equipment by using a spatial domain transmission filter identical to a spatial domain transmission filter transmitting an uplink signal related to beam failure recovery or receiving a downlink reference signal.

Hence, a solution where the terminal equipment transmits the uplink signal by using the spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). In a multi-carrier (multiple serving cells being configured) scenario, this solution may correctly indicate the spatial domain transmission filter used by the uplink signal of the first cell, and avoid incorrectly indicating the spatial domain transmission filter used by uplink signals of other cells (not the first cell).

Furthermore, this solution also accurately stipulates a starting point of the period of time, which avoids unnecessary errors in reception and transmission caused by inconsistent understanding of the period of time by the terminal equipment and the network device.

In step 201, after a period of time of receiving a downlink signal related to beam failure recovery and before receiving or applying activation signaling or reconfiguration signaling, the terminal equipment transmits an uplink signal in a first cell by using a spatial domain transmission filter identical to a spatial domain transmission filter transmitting an uplink signal related to beam failure recovery or receiving a downlink reference signal.

That is to say, after receiving the downlink signal related to beam failure recovery for a period of time, the terminal equipment transmits the uplink signal by using the spatial domain transmission filter identical to the spatial domain transmission filter transmitting an uplink signal related to beam failure recovery or receiving a downlink reference signal in a case where an uplink signal is needed to be transmitted in the first cell, until the terminal equipment receives or applies activation signaling or reconfiguration signaling.

Or, in other words, after the terminal equipment receives the downlink signal related to beam failure recovery, when an offset between a time of receiving the downlink signal related to beam failure recovery and a time when the terminal equipment transmits the uplink signal is greater than or equal to a period of time, the terminal equipment transmits the uplink signal in the first cell by using the spatial domain transmission filter identical to the spatial domain transmission filter transmitting an uplink signal related to beam failure recovery or receiving a downlink reference signal, until the terminal equipment receives or applies activation signaling or reconfiguration signaling.

In this embodiment, after the terminal equipment receives or applies the activation signaling or the reconfiguration signaling, it is no longer subject to the restrictions on the use of the spatial domain transmission filter in step 201.

In this embodiment, for the convenience of explanation, the moment when "the downlink signal related to beam failure recovery is received" is referred to as a first moment, and the moment when a period of time after "the downlink signal related to beam failure recovery is received" is referred to as a second moment, a moment when "activation signaling or reconfiguration signaling is received or applied" is referred to as a third moment, and a moment when "the uplink signal is transmitted in the first cell" is referred to as a fourth moment. Then, in step 201, the terminal equipment transmits the uplink signal in the first cell in a time interval between the second moment and the third moment by using the spatial domain transmission filter. Alternatively, it may also be understood that the terminal equipment transmits the uplink signal in the first cell by using the spatial domain transmission filter when an offset between the first time and fourth time is greater than or equal to the period of time and before the third time.

"A period of time of receiving a downlink signal related to beam failure recovery" in step 201 shall be first illustratively described below.

In this embodiment, the downlink signal related to beam failure recovery is a downlink signal related to beam failure recovery transmitted by the network device to the user equipment. For example, the downlink signal related to beam failure recovery is a beam failure recovery response and/or downlink data information scheduled by a beam failure recovery response.

In this embodiment, the beam failure recovery response may be downlink control information (DCI) received in a search space provided by a higher layer parameter and scrambled by a cell radio network temporary identifier (C-RNTI) or a modulation and coding scheme cell radio network temporary identifier (MCS-C-RNTI).

In this embodiment, the higher layer parameter may be configured by radio resource control (RRC) signaling.

In this embodiment, the higher layer parameter may be used for configuring a search space set receiving a beam failure recovery random access response (BFR RAR).

For example, the higher layer parameter is a recovery search space set identifier (recovery SearchSpaceId).

In this embodiment, the "period of time" may be set according to actual demand.

For example, the period of time may be a preset number of symbols, slots, or milliseconds (msec).

For example, the period of time is K symbols, or K slots, or K milliseconds; where, K is an integer greater than or equal to zero.

In this embodiment, a length of the period of time may be related to a subcarrier spacing (SCS).

For example, the length of the period of time will be changed at different subcarrier spacings.

For example, the number of symbols to which the length of the period of time corresponds may be proportional to the SCS, that is, when the SCS is 15 KHz, the length of the period of time is 14 symbols, when the SCS is 30 KHz, the length of the period of time is 28 symbols, and when the SCS is 60 KHz, the time length is 56 symbols, and so on.

For another example, a first time length (such as 14 symbols) is used when the SCS is 15 kHz and 30 kHz, and a second time length (such as 28 symbols) is used when the SCS is higher than 30 kHz.

In this embodiment, the length of the period of time may also be related to a UE capability. In particular, the UE capability refers to a UE capability reported to the network device.

For example, the length of the period of time may vary at different levels of UE capabilities.

For example, in a case of a first UE capability level (or information on the first UE capability level is reported), the length of the period of time is the first time length (such as 14 symbols), and in a case of a second UE capability level (or information on the second UE capability level is reported), the length of the period of time is the second time length (such as 28 symbols), and so on.

In this embodiment, the length of the period of time may be configured by higher layer signaling.

In this embodiment, the period of time may also be understood as a threshold. When an offset between the first time and the fourth time is greater than or equal to the threshold and before the third time, the terminal equipment transmits the uplink signal in the first cell by using the above specified spatial domain transmission filter.

In this embodiment, the first moment, i.e. the moment when the downlink signal related to beam failure recovery is received, may further be understood as:

for example, when the downlink signal is the beam failure recovery response, the moment when the downlink signal is received is a slot where the downlink signal is received; or, if the downlink signal is the beam failure recovery response, the moment when the downlink signal is received is a first or last symbol of a slot where the downlink signal is received; or, when the downlink signal is the beam failure recovery response, the moment when the downlink signal is received is a symbol (a first symbol/a last symbol) of a control resource set to which reception of (a search space of) the beam failure recovery response corresponds;

for another example, when the downlink signal is the downlink data information scheduled by the beam failure recovery response (such as a single-slot PDSCH, or a PDSCH of a slot of multi-slot PDSCHs), the moment when the downlink signal is received is the slot where the downlink signal is received; or, the downlink signal is the downlink data information (such as a PDSCH) scheduled by the beam failure recovery response, and when the terminal equipment is configured with a single-slot PDSCH, that is, the number of times of repetition of the configured PDSCH is 1 (aggregationFactorDL=1), the moment when the downlink signal is received is the slot where the downlink data information is received; or, the downlink signal is the downlink data information scheduled by the beam failure recovery response (such as a PDSCH), when the terminal equipment is configured with a multiple-slot PDSCH, that is, the number of times of repetition of the configured PDSCH is greater than 1 (aggregationFactorDL>1), the moment when the downlink signal is received is a slot to which the downlink data information is related (for example, the slot to which the downlink data information is related is a first slot of the downlink data information (including PDSCHs of multiple slots) or a last slot of the downlink data information (including PDSCHs of multiple slots);

for a further example, the downlink signal is the downlink data information (such as a single-slot PDSCH or a PDSCH of a slot of multi-slot PDSCHs) scheduled by the beam failure recovery response, the moment when the downlink signal is received is a symbol to which the downlink data information is related (for example, the symbol to which the downlink data information is related is a first symbol to which the downlink signal corresponds, or a last symbol to which the downlink signal corresponds); or, the downlink signal is the downlink data information (such as a PDSCH) scheduled by the beam failure recovery response, and when the terminal equipment is configured with a single-slot PDSCH, that is, the number of times of repetition of the configured PDSCH is 1 (aggregationFactorDL=1), the moment when the downlink signal is received is a first or last symbol of a resource (a PDSCH) bearing the downlink data information; or, the downlink signal is the downlink data information scheduled by the beam failure recovery response (such as a PDSCH), when the terminal equipment is configured with a multiple-slot PDSCH, that is, the number of times of repetition of the configured PDSCH is greater than 1 (aggregationFactorDL>1), the moment when the downlink signal is received is a symbol to which the downlink data information is related (for example, the symbol to which the downlink data information is related is a first symbol of a PDSCH of a first slot of the downlink signal (including PDSCHs of multiple slots) or a last symbol of a PDSCH of a last slot of the downlink signal (including PDSCHs of multiple slots).

In this embodiment, the fourth moment, i.e. the moment when the uplink signal in the first cell is transmitted, may further be understood as:

for example, when the uplink signal refers to uplink control information (a PUCCH), the moment when the uplink signal in the first cell is transmitted is a slot where the uplink control information in the first cell is transmitted; or, when the uplink signal refers to uplink control information (a PUCCH), the moment when the uplink signal in the first cell is transmitted is a symbol to which transmission of the uplink control information in the first cell is related (for example, a first symbol or a last symbol of the uplink control information; for example, a first symbol or a last symbol of a slot where the uplink control information in the first cell is transmitted);

for another example, when the uplink signal is uplink data information (such as a single-slot PUSCH, or a PUSCH of a slot of multi-slot PUSCHs), the moment when the uplink signal in the first cell is transmitted is the slot where the uplink signal in the first cell is transmitted; or, the uplink signal refers to uplink data information (a PUCCH), and when the terminal equipment is configured with a single-slot PDSCH, that is, the number of times of repetition of the configured PUSCH is equal to 1 (repK=1), the moment when the uplink signal in the first cell is transmitted is the slot where the uplink data information in the first cell is transmitted; or, the uplink signal refers to the uplink data information (a PUSCH), when the terminal equipment is configured with a multiple-slot PUSCH, that is, the number of times of repetition of the configured PUSCH is greater than 1 (repK>1), the moment when the uplink signal in the first cell is transmitted is a slot to which the uplink data information in the first cell is related (such as a first slot or a last slot transmitting the uplink data information (including PDSCHs of multiple slots) in the first cell);

for a further example, the uplink signal refers to uplink data information (such as a single-slot PUSCH or a slot of PUSCH of multi-slot PUSCH), the moment when the uplink signal in the first cell is transmitted is a symbol to which the uplink data information in the first cell is related (for example, the symbol to which the uplink data information is related is a first or last symbol of the uplink data information); or, the uplink signal refers to the uplink data information (such as a PUSCH), and when the terminal equipment is configured with a single-slot PDSCH, that is, the number of times of repetition of the configured PDSCH is equal to 1 (repK=1), the moment when the uplink signal in the first cell is transmitted is a first or last symbol of a resource bearing the uplink data information; or, the uplink signal refers to the uplink data information (a PUSCH), when the terminal equipment is configured with a multiple-slot PUSCH, that is, the number of times of repetition of the configured PUSCH is greater than 1 (repK>1), the moment when the uplink signal in the first cell is transmitted is a symbol to which transmission of the uplink data information in the first cell is related (such as a first symbol of a PUSCH of a first slot or a last symbol of a PUSCH of a last slot transmitting the uplink data information (including PUSCHs of multiple slots) in the first cell).

In this embodiment, the third moment, i.e. the moment when the activation signaling or the reconfiguration signaling is received or applied, may further be understood as:

for example, the moment when the activation signaling or reconfiguration signaling is received or applied is a moment when the activation signaling or reconfiguration signaling is applied, more specifically, a slot when activation signaling or reconfiguration signaling is applied; or, the time when the activation signaling or reconfiguration signaling is received or applied is a slot when a downlink signal (such as a single-slot PDSCH or a slot of PDSCH of multi-slot PDSCHs) to which the activation signaling or reconfiguration signaling corresponds is received; or, when the terminal equipment is configured with a single-slot PDSCH, that is, the number of times of repetition of the configured PDSCH is equal to 1 (aggregationFactorDL=1), the time when the activation signaling or reconfiguration signaling is received or applied is a slot when a PDSCH to which the activation signaling or reconfiguration signaling corresponds is received; or, when the terminal equipment is configured with a multiple-slot PDSCH, that is, the number of times of repetition of the configured PDSCH is greater than 1 (aggregationFactorDL>1), the time when the activation signaling or reconfiguration signaling is received or applied is a first or last slot when a downlink signal (including multi-slot PDSCH) to which the activation signaling or reconfiguration signaling corresponds is received.

The "receiving or applying activation signaling or reconfiguration signaling" in step 201 shall be illustratively described below.

In this embodiment, the activation signaling may also be indication signaling.

For example, the activation signaling may be at least one of the following:
activation signaling of a media access control (MAC) layer;
signaling indicating antenna panel switch of a terminal equipment; and
activation signaling of which a target cell is the first cell.

For example, the activation signaling of the MAC layer is used for indicating a spatial domain transmission filter to which transmission of a configured PUCCH resource corresponds; for example, what is indicated by the activation signaling is PUCCH-SpatialRelationInfo.

In this embodiment, the reconfiguration signaling may be at least one of the following:
RRC signaling;
reconfiguration signaling related to an antenna panel of a terminal equipment; and
reconfiguration signaling of which a target cell is the first cell.

For example, the RRC signaling reconfigures a spatial relation parameter with which at least one configured physical uplink control channel (PUCCH) resource is associated.

For example, the spatial relation parameter is PUCCH-SpatialRelationInfo.

"A period of time of receiving a downlink signal related to beam failure recovery" and "receiving or applying activation signaling or reconfiguration signaling" are described above as an example. "Transmitting an uplink signal in a first cell by using a spatial domain transmission filter identical to a spatial domain transmission filter transmitting an uplink signal related to beam failure recovery or receiving a downlink reference signal" in step 201 shall be illustratively described below.

In this embodiment, the uplink signal related to beam failure recovery may be at least one of the following:
a beam failure recovery request;
physical random access channel (PRACH) transmission for link failure recovery; and
physical random access channel (PRACH) transmission associated with the downlink signal related to beam failure recovery. In particular, the physical random access channel (PRACH) transmission may be temporally associated with the downlink signal related to beam failure recovery. For example, the physical random access channel (PRACH) transmission is performed at a slot n, and the corresponding downlink signal (a random access response for beam failure recovery) related to beam failure recovery is received at a slot n+4.

In this embodiment, the uplink signal related to beam failure recovery may be configured by a higher layer parameter.

In this embodiment, the higher layer parameter may be borne by radio resource control (RRC) signaling. More specifically, the higher layer parameter may be used for configuring a resource transmitting the uplink signal related to beam failure recovery specific for beam failure recovery (BFR). For example, the higher layer parameter is PRACH-ResourceDedicatedBFR.

In this embodiment, the downlink reference signal may be a downlink reference signal of the first cell.

In this embodiment, an index of the downlink reference signal may be provided by signaling of the MAC layer. For example, the index of the downlink reference signal is selected by the MAC layer from a higher layer parameter.

For example, the index of the downlink reference signal is $q_{new}$, and the MAC layer entity selects $q_{new}$ from the RRC layer parameter. For example, the RRC layer parameter is a parameter candidateBeamRSList that represents a candidate beam reference signal list.

In step 201, when a second cell where the uplink signal related to beam failure recovery is transmitted is the same cell as the first cell, the uplink signal in the first cell is transmitted by using the spatial domain transmission filter identical to the spatial domain transmission filter transmitting the uplink signal related to beam failure recovery; and when the second cell where the uplink signal related to beam failure recovery is transmitted is a different cell from the first cell, the uplink signal in the first cell is transmitted by using the spatial domain transmission filter identical to the spatial domain transmission filter receiving the downlink reference signal.

FIG. 3 is another schematic diagram of the signal transmission method of Embodiment 1 of this disclosure. As shown in FIG. 3, the method includes:

Step 301: it is determined by the terminal equipment whether the second cell where the uplink signal related to beam failure recovery is transmitted is the same cell as the first cell, entering into step 302 when a determination result is "yes", and entering into step 303 when the determination result is "no";

Step 302: after a period of time of receiving a downlink signal related to beam failure recovery and before receiving or applying activation signaling or reconfiguration signaling, an uplink signal in a first cell is transmitted by a terminal equipment by using a spatial domain transmission filter identical to a spatial domain transmission filter transmitting an uplink signal related to beam failure recovery; and Step 303: after a period of time of receiving a downlink signal related to beam failure recovery and before receiving or applying activation signaling or reconfiguration signaling, an uplink signal in a first cell is transmitted by a terminal equipment by using a spatial domain transmission filter identical to a spatial domain transmission filter receiving a downlink reference signal.

In this embodiment, the first cell may be at least one of the following cells:
a cell where the uplink signal related to beam failure recovery is transmitted;

a cell where a random process to which transmission of the uplink signal related to beam failure recovery corresponds is initiated;

a cell where configuration information on the random process to which transmission of the uplink signal related to beam failure recovery corresponds is located;

a cell where the downlink signal related to beam failure recovery is received; and at least one activated cell or all activated cells; wherein, the activated cell refers to a cell activated by a network device for a terminal equipment via indication signaling.

When the first cell is a cell where the uplink signal related to beam failure recovery is transmitted, the first cell and the second cell are the same cell.

In this embodiment, the uplink signal in the first cell is, for example, an uplink signal transmitted on a physical uplink control channel (PUCCH) and/or an uplink signal transmitted on a physical uplink shared channel (PUSCH).

For example, the uplink signal transmitted on the physical uplink control channel is acknowledgement information (such as HARQ ACK/NACK information) used for bearing a downlink signal scheduled by first control information. A search space with which the first control information is associated is identical to a search space with which the downlink signal related to beam failure recovery is associated. For example, the search space is provided by recovery SearchSpaceId.

Figure 4:
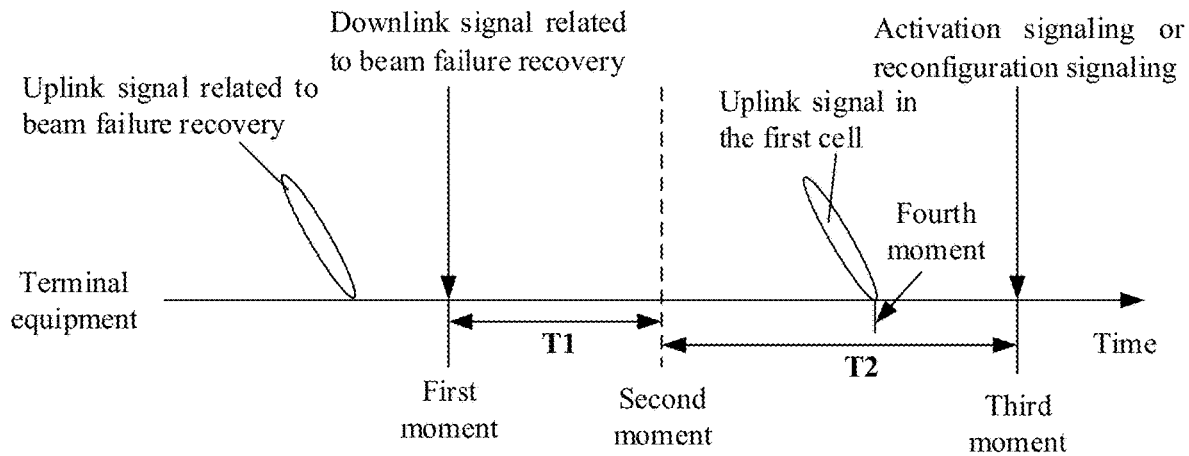
FIG. 4 is a sequence diagram of transmitting and receiving signals of Embodiment 1 of this disclosure.

FIG. 4 is a sequence diagram of transmitting and receiving signals of Embodiment 1 of this disclosure. As shown in FIG. 4, after a beam failure occurs, the terminal equipment transmits the uplink signal related to beam failure recovery, such as a beam recovery request, to the network device; at the first moment, the terminal equipment receives the downlink signal related to beam failure recovery, such as a beam failure recovery response, from the network device; within a time interval T2 starting from the second moment after a period of time T1 of the first moment when the downlink signal related to beam failure recovery is successfully received and ending at the third moment when the terminal equipment receives or applies the activation signaling or reconfiguration signaling from the network device, the terminal equipment transmits the uplink signal in the first cell (at the fourth time) by using the spatial domain transmission filter identical to the spatial domain transmission filter transmitting the uplink signal related to beam failure recovery or receiving the downlink reference signal, the uplink signal being, for example, an uplink signal transmitted on a PUCCH or a PUSCH.

It can be seen from the above embodiment that after a period of time of receiving the downlink signal related to beam failure recovery and before receiving or applying activation signaling or reconfiguration signaling, the terminal equipment transmits the uplink signal in the first cell by using the spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 2

The embodiment of this disclosure provides a signal reception method. This method is applicable to a network device side and corresponds to the signal transmission method described in Embodiment 1.

FIG. 5 is a schematic diagram of the signal reception method of Embodiment 2 of this disclosure. As shown in FIG. 5, the method includes:

Step 501: after a period of time of transmitting a downlink signal related to beam failure recovery and before transmitting activation signaling or reconfiguration signaling or applying activation signaling or reconfiguration signaling, an uplink signal in a first cell is received by a network device according to spatial information on receiving uplink signal related to beam failure recovery or transmitting a downlink reference signal.

Hence, a solution where a network device receives an uplink signal according to spatial information after beam failure recovery is successful is provided, in which reliability of the network device in receiving an uplink signal is improved. In addition, the solution has a wide range of applicability, and is not only suitable for scenarios where beam failure occurs in a special cell (SpCell), but also in scenarios where beam failure occurs in a secondary cell (SCell). In a multi-carrier (multiple serving cells being configured) scenario, this solution may correctly indicate the spatial information used for transmitting the uplink signal of the first cell, and avoid incorrectly indicating the spatial information used by uplink signals of other cells (not the first cell).

Furthermore, this solution also accurately stipulates a starting point of the period of time, which avoids unnecessary errors in reception and transmission caused by inconsistent understanding of the period of time by the terminal equipment and the network device.

In this embodiment, the uplink signal in the first cell is received according to the spatial information related to receiving uplink signals related to beam failure recovery or transmitting downlink reference signals, such as receiving the uplink signal in the first cell by using a spatial domain transmission filter identical to a spatial domain transmission filter receiving an uplink signal related to beam failure recovery or transmitting a downlink reference signal.

In step 501, after a period of time of transmitting a downlink signal related to beam failure recovery and before transmitting activation signaling or reconfiguration signaling or applying activation signaling or reconfiguration signaling, the network device receives the uplink signal in the first cell according to spatial information on receiving uplink signal related to beam failure recovery or transmitting a downlink reference signal.

That is to say, a period of time after transmitting the downlink signal related to the beam failure recovery, the network device receives the uplink signal according to the spatial information on receiving uplink signal related to beam failure recovery or transmitting a downlink reference signal when it is needed to receive the uplink signal in the first cell, until the network device transmits the activation signaling or reconfiguration signaling or the activation signaling or reconfiguration signaling is applied.

Or, that is to say, after the network device transmits the downlink signal related to beam failure recovery, if an offset between a time of transmitting the downlink signal related to beam failure recovery and a time when the network device receives the uplink signal is greater than or equal to a period of time, the network device receives the uplink signal in the first cell according to the spatial information on the spatial domain transmission filter receiving an uplink signal related to beam failure recovery or transmitting a downlink reference signal, until the network device transmits the activation signaling or reconfiguration signaling or the activation signaling or reconfiguration signaling is applied.

In this embodiment, for the convenience of explanation, the moment when "the downlink signal related to beam failure recovery is transmitted" is referred to as a first moment, and the moment when a period of time after "the downlink signal related to beam failure recovery is transmitted" is referred to as a second moment, a moment when "the activation signaling or reconfiguration signaling is transmitted or activation signaling or reconfiguration signaling is applied" is referred to as a third moment, and a moment when "the uplink signal is received in the first cell" is referred to as a fourth moment. Then, in step 501, the network device receives the uplink signal in the first cell in a time interval between the second moment and the third moment by using the spatial information. Alternatively, it may also be understood that the network device receives the uplink signal in the first cell according to the above spatial information when an offset between the first moment and fourth moment is greater than or equal to a period of time and before the third moment. In this embodiment, after the activation signaling or reconfiguration signaling is transmitted or activation signaling or reconfiguration signaling is applied, the network device is no longer restricted to the use of the spatial information in the step 501.

In this embodiment, the downlink signal related to beam failure recovery is a downlink signal related to beam failure recovery transmitted by the network device to the user equipment. For example, the downlink signal related to beam failure recovery is a beam failure recovery response and/or downlink data information scheduled by a beam failure recovery response.

In this embodiment, the beam failure recovery response may be downlink control information (DCI) transmitted in a search space provided by a higher layer parameter and scrambled by a cell radio network temporary identifier (C-RNTI) or a modulation and coding scheme cell radio network temporary identifier (MCS-C-RNTI).

In this embodiment, the higher layer parameter may be configured by radio resource control (RRC) signaling.

In this embodiment, the higher layer parameter may be used for configuring a search space set transmitting a beam failure recovery random access response (BFR RAR).

For example, the higher layer parameter is a recovery search space set identifier (recovery SearchSpaceId).

In this embodiment, the "period of time" may be set according to as actually demanded.

For example, the period of time may be a preset number of symbols, slots, or milliseconds (msec).

For example, the period of time is K symbols, or K slots, or K milliseconds; where, K is an integer greater than or equal to zero.

In this embodiment, a length of the period of time may be related to a subcarrier spacing (SCS).

For example, the length of the period of time will be changed at different subcarrier spacings.

For example, the number of symbols to which the length of the period of time corresponds may be proportional to the SCS, that is, when the SCS is 15 KHz, the length of the period of time is 14 symbols, when the SCS is 30 KHz, the length of the period of time is 28 symbols, and when the SCS is 60 KHz, the time length is 56 symbols, and so on.

For another example, a first time length (such as 14 symbols) is used when the SCS is 15 kHz and 30 kHz, and a second time length (such as 28 symbols) is used when the SCS is higher than 30 kHz.

In this embodiment, the length of the period of time may also be related to a UE capability. In particular, the UE capability refers to a UE capability reported to the network device.

For example, the length of the period of time may vary at different levels of UE capabilities.

For example, in a case of a first UE capability level (or information on the first UE capability level is reported), the length of the period of time is the first time length (such as 14 symbols), and in a case of a second UE capability level (or information on the second UE capability level is reported), the length of the period of time is the second time length (such as 28 symbols), and so on.

In this embodiment, the length of the period of time may be configured by higher layer signaling.

In this embodiment, the period of time may also be understood as a threshold. When an offset between the first time and the fourth time is greater than or equal to the threshold and before the third time, the network device receives the uplink signal in the first cell according to the above spatial information.

In this embodiment, particular explanations of the "first moment", "second moment", "third moment" and "fourth moment" may be similar to what is described in Embodiment 1, and shall not be described herein any further.

In this embodiment, the activation signaling may also be indication signaling.

For example, the activation signaling may be at least one of the following:
  activation signaling of a media access control (MAC) layer;
  signaling indicating antenna panel switch of a terminal equipment; and
  activation signaling of which a target cell is the first cell.

For example, the activation signaling of the MAC layer is used for indicating a spatial domain transmission filter to which reception of a configured PUCCH resource corresponds; for example, what is indicated by the activation signaling is PUCCH-SpatialRelationInfo.

In this embodiment, the reconfiguration signaling may be at least one of the following:
  RRC signaling;
  reconfiguration signaling related to an antenna panel of a terminal equipment; and
  reconfiguration signaling of which a target cell is the first cell.

For example, the RRC signaling reconfigures a spatial relationship parameter with which at least one configured physical uplink control channel (PUCCH) resource is associated.

In this embodiment, the uplink signal related to beam failure recovery may be at least one of the following:
  a beam failure recovery request;
  physical random access channel (PRACH) reception for link failure recovery; and
  physical random access channel (PRACH) reception associated with the downlink signal related to beam failure recovery. In particular, the physical random access channel (PRACH) reception may be temporally associated with the downlink signal related to beam failure recovery. For example, the physical random access channel (PRACH) reception is performed at a slot n, and the corresponding downlink signal related to beam failure recovery (a random access response for beam failure recovery) is transmitted at a slot n+4.

In this embodiment, the uplink signal related to beam failure recovery may be borne by higher layer parameters.

In this embodiment, the higher layer parameter may be borne by RRC signaling.

More specifically,
the higher layer parameter may be used for configuring a resource transmitting the uplink signal related to beam failure recovery specific for beam failure recovery (BFR). For example, the higher layer parameter is PRACH-ResourceDedicatedBFR.

In this embodiment, the downlink reference signal may be the downlink reference signal of the first cell.

In this embodiment, an index of the downlink reference signal may be provided by signaling of the MAC layer. For example, the index of the downlink reference signal is selected by the MAC layer from a higher layer parameter.

For example, the index of the downlink reference signal is $q_{new}$, and the MAC layer entity selects $q_{new}$ from the RRC layer parameter. For example, the RRC layer parameter is a parameter candidateBeamRSList that represents a candidate beam reference signal list.

In step 501, when a second cell where the uplink signal related to beam failure recovery is received is the same cell as the first cell, the uplink signal in the first cell is received according to the spatial information on reception of the uplink signal related to the beam failure recovery; and when the second cell where the uplink signal related to beam failure recovery is received is a different cell from the first cell, the uplink signal in the first cell is received according to the spatial information on transmission of the downlink reference signal.

FIG. 6 is another schematic diagram of the signal reception method of Embodiment 2 of this disclosure. As shown in FIG. 6, the method includes:

Step 601: it is determined by the network device whether the second cell where the uplink signal related to beam failure recovery is received is the same cell as the first cell, entering into step 602 when a determination result is "yes", and entering into step 603 when the determination result is "no";

Step 602: after a period of time of transmitting a downlink signal related to beam failure recovery and before transmitting activation signaling or reconfiguration signaling or applying activation signaling or reconfiguration signaling, an uplink signal in a first cell is received by the network device according to spatial information on reception of an uplink signal related to beam failure recovery; and Step 603: after a period of time of transmitting a downlink signal related to beam failure recovery and before transmitting activation signaling or reconfiguration signaling or applying activation signaling or reconfiguration signaling, an uplink signal in a first cell is received by the network device according to spatial information on transmission of a downlink reference signal.

In this embodiment, the first cell may be at least one of the following cells:
a cell where the uplink signal related to beam failure recovery is received;
a cell where a random process to which reception of the uplink signal related to beam failure recovery corresponds is initiated;
a cell where configuration information on the random process to which transmission of the uplink signal related to beam failure recovery corresponds is located;
a cell where the downlink signal related to beam failure recovery is transmitted; and
at least one activated cell or all activated cells; wherein, the activated cell refers to a cell activated by a network device for a terminal equipment via indication signaling.

In a case where the first cell is a cell where the uplink signal related to beam failure recovery is transmitted, the first cell and the second cell are the same cell.

In this embodiment, the uplink signal on the first cell is, for example, an uplink signal received on a physical uplink control channel (PUCCH) and/or an uplink signal received on a physical uplink shared channel (PUSCH).

For example, the uplink signal received on the physical uplink control channel is acknowledgement information (such as HARQ ACK/NACK information) used for bearing a downlink signal scheduled by first control information. A search space with which the first control information is associated is identical to a search space with which the downlink signal related to beam failure recovery is associated. For example, the search space is provided by recovery SearchSpaceId.

It can be seen from the above embodiment that after a period of time of transmitting the downlink signal related to beam failure recovery and before transmitting activation signaling or reconfiguration signaling or applying activation signaling or reconfiguration signaling, the network device receives the uplink signal in the first cell according to the spatial information on reception of the uplink signal related to beam failure recovery or transmission of a downlink reference signal. Hence, a solution where a network device receives an uplink signal according to spatial information after beam failure recovery is successful is provided, in which reliability of the network device in receiving an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 3

The embodiment of this disclosure provides a signal transmission method. This method is applicable to a terminal equipment side and a network device side and corresponds to the signal transmission method described in Embodiment 1 and the signal reception method described in Embodiment 2, with repeated parts being not going to be described herein any further.

Figure 7:
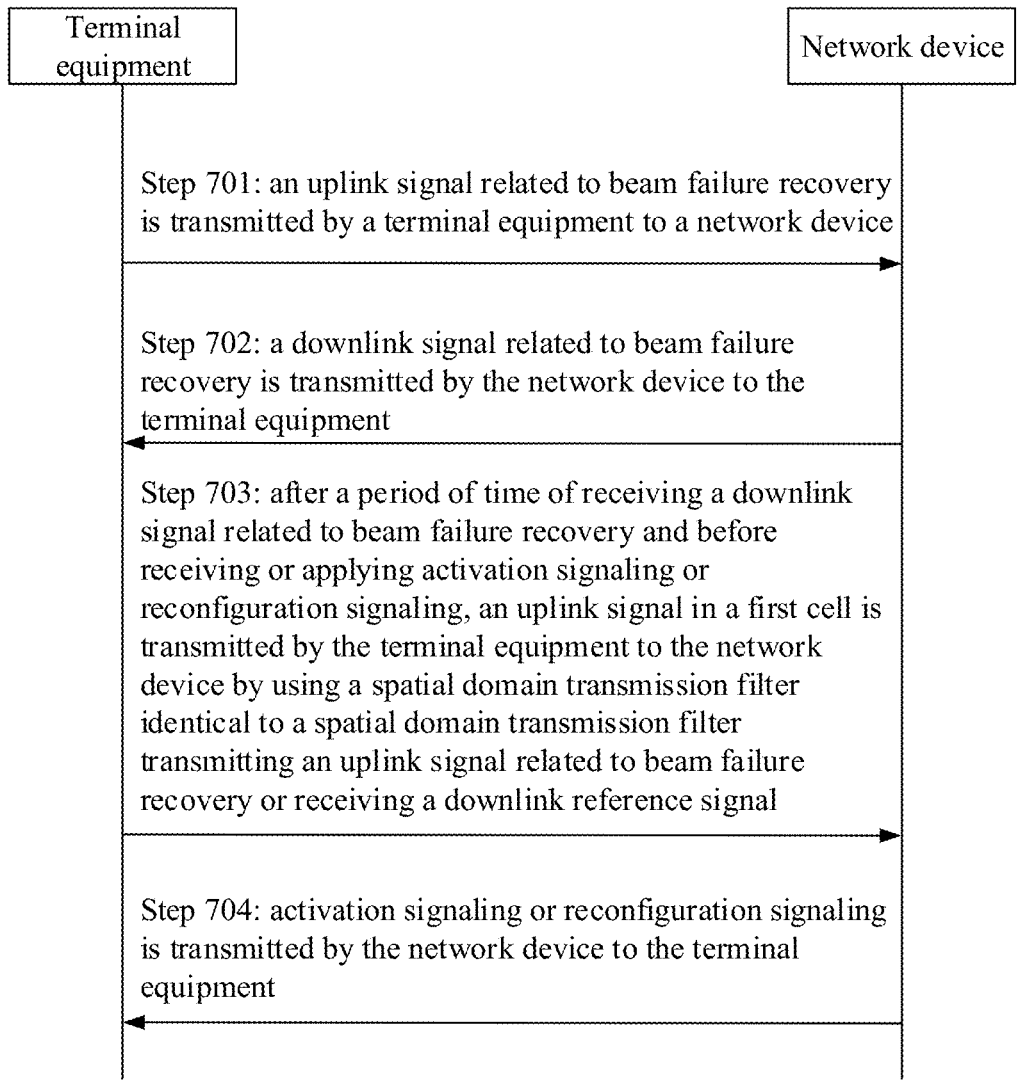
FIG. 7 is a schematic diagram of the signal transmission method of Embodiment 3 of this disclosure.

FIG. 7 is a schematic diagram of the signal transmission method of Embodiment 3 of this disclosure. As shown in FIG. 7, the method includes:

Step 701: an uplink signal related to beam failure recovery is transmitted by a terminal equipment to a network device;

Step 702: a downlink signal related to beam failure recovery is transmitted by the network device to the terminal equipment;

Step 703: after a period of time of receiving a downlink signal related to beam failure recovery and before receiving or applying activation signaling or reconfiguration signaling, an uplink signal in a first cell is transmitted by the terminal equipment to the network device by using a spatial domain transmission filter identical to a spatial domain transmission filter transmitting an uplink signal related to beam failure recovery or receiving a downlink reference signal; and Step 704: activation signaling or reconfiguration signaling is transmitted by the network device to the terminal equipment.

In this embodiment, reference may be made to what is contained in embodiments 1 and 2 for implementations of the above steps, which shall not be described herein any further.

It can be seen from the above embodiment that after a period of time of receiving the downlink signal related to beam failure recovery and before receiving or applying activation signaling or reconfiguration signaling, the terminal equipment transmits the uplink signal in the first cell by using the spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 4

The embodiment of this disclosure provides a signal transmission apparatus, applicable to a terminal equipment side. This apparatus corresponds to the signal transmission method described in Embodiment 1, and reference may be made to Embodiment 1 for particular implementation of this apparatus, with repeated parts being not going to be described herein any further.

Figure 8:
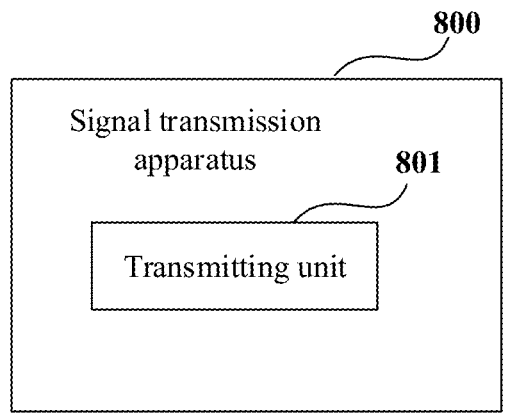
FIG. 8 is a schematic diagram of the signal transmission apparatus of Embodiment 4 of this disclosure.

FIG. 8 is a schematic diagram of the signal transmission apparatus of Embodiment 4 of this disclosure. As shown in FIG. 8, a signal transmission apparatus 800 includes:

a transmitting unit 801 configured to, after a period of time of receiving a downlink signal related to beam failure recovery and before receiving or applying activation signaling or reconfiguration signaling, transmit an uplink signal in a first cell by using a spatial domain transmission filter identical to a spatial domain transmission filter transmitting an uplink signal related to beam failure recovery or receiving a downlink reference signal.

In this embodiment, when a second cell where the uplink signal related to beam failure recovery is transmitted is the same cell as the first cell, the transmitting unit 801 transmits the uplink signal in the first cell by using the spatial domain transmission filter identical to the spatial domain transmission filter transmitting the uplink signal related to beam failure recovery; and when the second cell where the uplink signal related to beam failure recovery is transmitted is a different cell from the first cell, the transmitting unit 801 transmits the uplink signal in the first cell by using the spatial domain transmission filter identical to the spatial domain transmission filter receiving the downlink reference signal.

In this embodiment, reference may be made to a corresponding step in Embodiment 1 for particular implementation of a function of the transmitting unit 801, which shall not be described herein any further.

It can be seen from the above embodiment that after a period of time of receiving the downlink signal related to beam failure recovery and before receiving or applying activation signaling or reconfiguration signaling, the terminal equipment transmits the uplink signal in the first cell by using the spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 5

The embodiment of this disclosure provides a signal reception apparatus, applicable to a network device side. This apparatus corresponds to the signal reception method described in Embodiment 2, and reference may be made to Embodiment 2 for particular implementation of this apparatus, with repeated parts being not going to be described herein any further.

Figure 9:
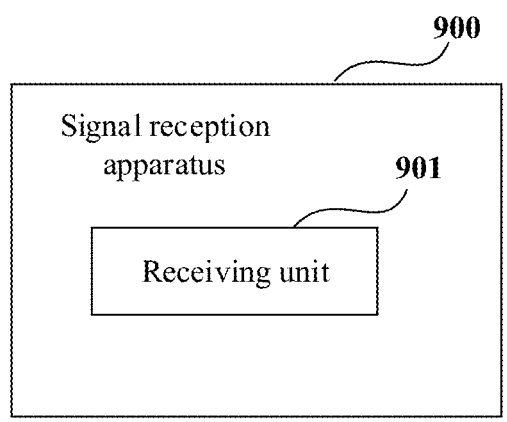
FIG. 9 is a schematic diagram of the signal reception apparatus of Embodiment 5 of this disclosure.

FIG. 9 is a schematic diagram of the signal reception apparatus of Embodiment 5 of this disclosure. As shown in FIG. 9, a signal reception apparatus 900 includes:

a receiving unit 901 configured to, after a period of time of transmitting a downlink signal related to beam failure recovery and before transmitting activation signaling or reconfiguration signaling or applying activation signaling or reconfiguration signaling, receive an uplink signal in a first cell according to spatial information on receiving uplink signal related to beam failure recovery or transmitting a downlink reference signal.

In this embodiment, when a second cell where the uplink signal related to beam failure recovery is received is the same cell as the first cell, the receiving unit 901 receives the uplink signal in the first cell by using the spatial information on receiving uplink signal related to beam failure recovery; and when the second cell where the uplink signal related to beam failure recovery is received is the same cell as the first cell, the receiving unit 901 receives the uplink signal in the first cell by using the spatial information on transmitting the downlink reference signal.

In this embodiment, reference may be made to a corresponding step in Embodiment 2 for particular implementation of a function of the receiving unit 901, which shall not be described herein any further.

It can be seen from the above embodiment that after a period of time of transmitting the downlink signal related to beam failure recovery and before transmitting activation signaling or reconfiguration signaling or applying activation signaling or reconfiguration signaling, the network device receives the uplink signal in the first cell according to the spatial information on reception of the uplink signal related to beam failure recovery or transmission of a downlink reference signal. Hence, a solution where a network device receives an uplink signal according to spatial information after beam failure recovery is successful is provided, in which reliability of the network device in receiving an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 6

The embodiment of this disclosure provides a terminal equipment, including the signal transmission apparatus described in Embodiment 4.

Figure 10:
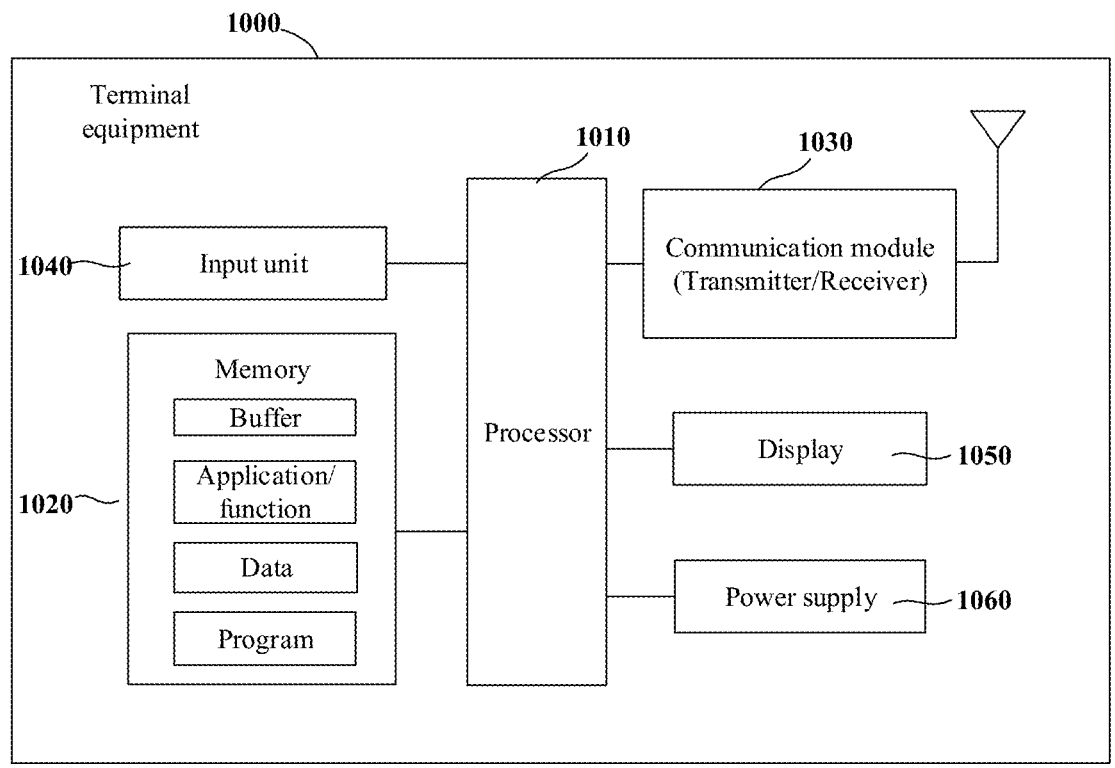
FIG. 10 is a block diagram of a systematic structure of the terminal equipment of Embodiment 6 of this disclosure.

FIG. 10 is a schematic diagram of a systematic structure of the terminal equipment of Embodiment 6 of this disclosure. As shown in FIG. 10, a terminal equipment 1000 may include a processor 1010 and a memory 1020, the memory 1020 being coupled to the processor 1010. It should be noted that his figure is illustrative only, and other types of structures may also be used, so as to supplement or replace this structure and achieve a telecommunications function or other functions.

In one implementation, the functions of the signal transmission apparatus may be integrated into the processor 1010. For example, the processor 1010 may be configured to, after a period of time of receiving a downlink signal related to beam failure recovery and before receiving or applying activation signaling or reconfiguration signaling, transmit an uplink signal in a first cell by using a spatial domain transmission filter identical to a spatial domain transmission filter transmitting an uplink signal related to beam failure recovery or receiving a downlink reference signal.

For example, when a second cell where the uplink signal related to beam failure recovery is transmitted is the same cell as the first cell, the uplink signal in the first cell is transmitted by using the spatial domain transmission filter identical to the spatial domain transmission filter transmitting the uplink signal related to beam failure recovery.

For example, when the second cell where the uplink signal related to beam failure recovery is transmitted is a different cell from the first cell, the uplink signal in the first cell is transmitted by using the spatial domain transmission filter identical to the spatial domain transmission filter receiving the downlink reference signal.

In another implementation, the signal transmission apparatus and the processor 1010 may be configured separately; for example, the signal transmission apparatus may be configured as a chip connected to the processor 1010, and the functions of the signal transmission apparatus are executed under control of the processor 1010.

As shown in FIG. 10, the terminal equipment 1000 may further include a communication module 1030, an input unit 1040, a display 1050, and a power supply 1060. It should be noted that the terminal equipment 1000 does not necessarily include all the parts shown in FIG. 10. Furthermore, the terminal equipment 1000 may include parts not shown in FIG. 10, and the related art may be referred to.

As shown in FIG. 10, the processor 1010 is sometimes referred to as a controller or control, which may include a microprocessor or other processor devices and/or logic devices, and the processor 1010 receives input and controls operations of every component of the terminal equipment 1000.

In this embodiment, the memory 1020 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 1010 may execute programs stored in the memory 1020, so as to realize information storage or processing, etc. Functions of other parts are similar to those of the related art, which shall not be described herein any further. The parts of the terminal equipment 1000 may be realized by specific hardware, firmware, software, or any combination thereof, without departing from the scope of this disclosure.

It can be seen from the above embodiment that after a period of time of receiving the downlink signal related to beam failure recovery and before receiving or applying activation signaling or reconfiguration signaling, the terminal equipment transmits the uplink signal in the first cell by using the spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 7

The embodiment of this disclosure provides a network device, including the signal reception apparatus described in Embodiment 5.

Figure 11:
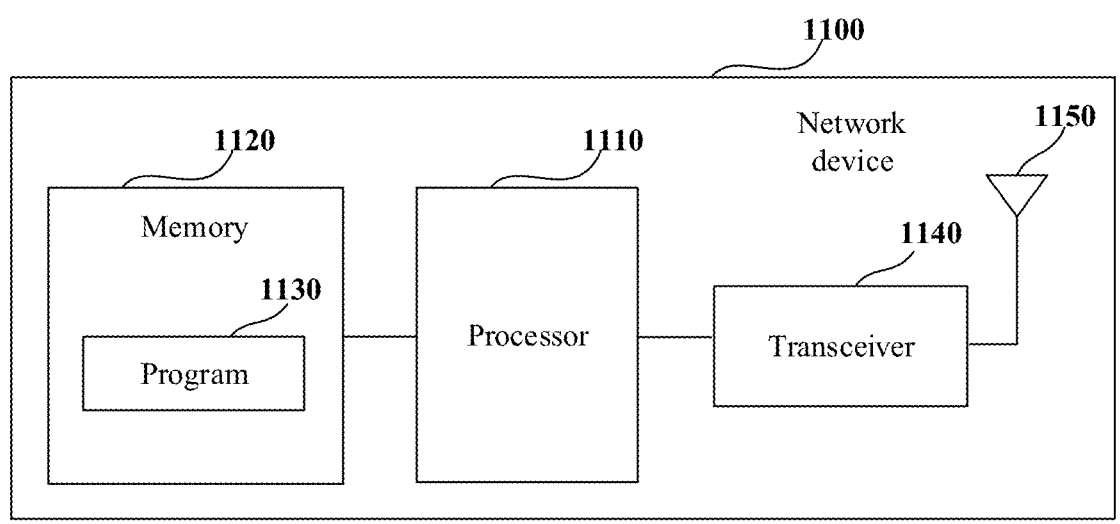
FIG. 11 is a schematic diagram of a structure of the network device of Embodiment 7 of this disclosure.

FIG. 11 is a schematic diagram of a structure of the network device of the embodiment of this disclosure. As shown in FIG. 11, a network device 1100 may include a processor 1110 and a memory 1120, the memory 1120 being coupled to the processor 1110. The memory 1120 may store various data, and furthermore, it may store a program 1130 for information processing, and execute the program 1130 under control of the processor 1110, so as to receive various information transmitted by a terminal equipment and transmit various information to the terminal equipment.

In one implementation, the functions of the signal reception apparatus may be integrated into the processor 1110. For example, the processor 1110 may be configured to, after a period of time of transmitting a downlink signal related to beam failure recovery and before transmitting activation signaling or reconfiguration signaling or applying activation signaling or reconfiguration signaling, receive an uplink signal in a first cell according to spatial information on receiving uplink signal related to beam failure recovery or transmitting a downlink reference signal.

For example, when a second cell where the uplink signal related to beam failure recovery is received is the same cell as the first cell, the uplink signal in the first cell is received according to spatial information on reception of the uplink signal related to beam failure recovery.

For example, when the second cell where the uplink signal related to beam failure recovery is received is a different cell from the first cell, the uplink signal in the first cell is received according to spatial information on transmission of the downlink reference signal.

In another implementation, the signal reception apparatus and the processor 1110 may be configured separately; for example, the signal reception apparatus may be configured as a chip connected to the processor 1110, and the functions of the signal reception apparatus are executed under control of the processor 1110.

Furthermore, as shown in FIG. 11, the network device 1100 may include a transceiver 1140, and an antenna 1150, etc. For example, functions of the above components are similar to those in the related art, and shall not be described herein any further. It should be noted that the network device 1100 does not necessarily include all the parts shown in FIG. 11. Furthermore, the network device 1100 may include parts not shown in FIG. 11, and the related art may be referred to.

It can be seen from the above embodiment that after a period of time of transmitting the downlink signal related to beam failure recovery and before transmitting activation signaling or reconfiguration signaling or applying activation signaling or reconfiguration signaling, the network device receives the uplink signal in the first cell according to the spatial information on reception of the uplink signal related to beam failure recovery or transmission of a downlink reference signal. Hence, a solution where a network device receives an uplink signal according to spatial information after beam failure recovery is successful is provided, in which reliability of the network device in receiving an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

Embodiment 8

The embodiment of this disclosure provides a communication system, including the terminal equipment described in Embodiment 6 and/or the network device described in Embodiment 7.

For example, reference may be made to FIG. 1 for a structure of the communication system. As shown in FIG. 1, the communication system 100 includes a network device 101 and a terminal equipment 102, the terminal equipment 102 being identical to the terminal equipment described in Embodiment 6, and the network device 101 being identical to the network device described in Embodiment 7, with repeated parts being not going to be described herein any further.

It can be seen from the above embodiment that after a period of time of receiving the downlink signal related to beam failure recovery and before receiving or applying activation signaling or reconfiguration signaling, the terminal equipment transmits the uplink signal in the first cell by using the spatial domain transmission filter identical to a spatial domain transmission filter transmitting an uplink signal related to beam failure recovery or receiving a downlink reference signal. Hence, a solution where a terminal equipment transmits an uplink signal by using a spatial domain transmission filter after beam failure recovery is successful is provided, in which reliability of the terminal equipment in transmitting an uplink signal is improved. In addition, the solution has a wide range of applicability, and is not only suitable for scenarios where beam failure occurs in a special cell (SpCell), but also in scenarios where beam failure occurs in a secondary cell (SCell). Furthermore, this solution also accurately stipulates a starting point of the period of time, which avoids unnecessary errors in reception and transmission caused by inconsistent understanding of the period of time by the terminal equipment and the network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 8 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 8 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 8 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Regarding implementations containing the above embodiments, following supplements are further discloses:

Supplement 1. A signal transmission apparatus, including:
a transmitting unit configured to, after a period of time of receiving a downlink signal related to beam failure recovery and before receiving or applying activation signaling or reconfiguration signaling, transmit an uplink signal in a first cell by using a spatial domain transmission filter identical to a spatial domain transmission filter transmitting an uplink signal related to beam failure recovery or receiving a downlink reference signal.

Supplement 2. The apparatus according to supplement 1, wherein,
when a second cell where the uplink signal related to beam failure recovery is transmitted is the same cell as the first cell, the transmitting unit transmits the uplink signal in the first cell by using the spatial domain transmission filter identical to the spatial domain transmission filter transmitting the uplink signal related to beam failure recovery.

Supplement 3. The apparatus according to supplement 1 or 2, wherein,
when the second cell where the uplink signal related to beam failure recovery is transmitted is a different cell from the first cell, the transmitting unit transmits the uplink signal in the first cell by using the spatial domain transmission filter identical to the spatial domain transmission filter receiving the downlink reference signal.

Supplement 4. The apparatus according to supplement 1, wherein,
the downlink signal related to beam failure recovery is a beam failure recovery response and/or downlink data information scheduled by a beam failure recovery response.

Supplement 5. The apparatus according to supplement 4, wherein,
the beam failure recovery response is downlink control information (DCI) received in a search space provided by a higher layer parameter and scrambled by a cell radio network temporary identifier (C-RNTI) or a modulation and coding scheme cell radio network temporary identifier (MCS-C-RNTI).

Supplement 6. The apparatus according to supplement 5, wherein,
the higher layer parameter is configured by radio resource control (RRC) signaling, and/or
the higher layer parameter is used for configuring a search space set receiving a beam failure recovery random access response (BFR RAR).

Supplement 7. The apparatus according to supplement 1, wherein,
the period of time satisfies at least one of the following:
the period of time is a preset number of symbols, or slots, or milliseconds;
a length of the period of time is configured by higher layer signaling;
the length of the period of time is related to a subcarrier spacing (SCS); and
the length of the period of time is related to a UE capability.

Supplement 8. The apparatus according to supplement 1, wherein,
the uplink signal related to beam failure recovery is at least one of the following:
a beam failure recovery request;
physical random access channel (PRACH) transmission for link failure recovery; and
physical random access channel (PRACH) transmission associated with the downlink signal related to beam failure recovery.

Supplement 9. The apparatus according to supplement 1 or 8, wherein,
the uplink signal related to beam failure recovery is configured by a higher layer parameter.

Supplement 10. The apparatus according to supplement 9, wherein,
the higher layer parameter is borne by radio resource control (RRC) signaling, and/or
the higher layer parameter is used for configuring a resource transmitting the uplink signal related to beam failure recovery specific for beam failure recovery (BFR).

Supplement 11. The apparatus according to supplement 1, wherein,
the downlink reference signal is a downlink reference signal of the first cell, and/or
an index of the downlink reference signal is provided by signaling of a media access control (MAC) layer.

Supplement 12. The apparatus according to supplement 11, wherein,
the index of the downlink reference signal is selected by the MAC layer from a higher layer parameter.

Supplement 13. The apparatus according to supplement 1, wherein,
the first cell is at least one of the following cells:
a cell where the uplink signal related to beam failure recovery is transmitted;
a cell where a random process to which transmission of the uplink signal related to beam failure recovery corresponds is initiated;
a cell where configuration information on the random process to which transmission of the uplink signal related to beam failure recovery corresponds is located;
a cell where the downlink signal related to beam failure recovery is received; and
at least one activated cell or all activated cells; wherein, the activated cell refers to a cell activated by a network device for a terminal equipment via indication signaling.

Supplement 14. The apparatus according to supplement 13, wherein,
the uplink signal in the first cell is an uplink signal transmitted on a physical uplink control channel (PUCCH) and/or an uplink signal transmitted on a physical uplink shared channel (PUSCH).

Supplement 15. The apparatus according to supplement 14, wherein, the uplink signal transmitted on the physical uplink control channel is acknowledgement information used for bearing a downlink signal scheduled by first control information.

Supplement 16. The apparatus according to supplement 15, wherein, a search space with which the first control information is associated is identical to a search space with which the downlink signal related to beam failure recovery is associated.

Supplement 17. The apparatus according to supplement 1, wherein, the activation signaling is at least one of the following:
activation signaling of an MAC layer;
signaling indicating antenna panel switch of a terminal equipment; and
activation signaling of which a target cell is the first cell.

Supplement 18. The apparatus according to supplement 17, wherein, the activation signaling of the MAC layer is used for indicating a spatial domain transmission filter to which transmission of a PUCCH resource corresponds.

Supplement 19. The apparatus according to supplement 1, wherein, the reconfiguration signaling is at least one of the following:
RRC signaling;
reconfiguration signaling related to an antenna panel of a terminal equipment; and
reconfiguration signaling of which a target cell is the first cell.

Supplement 20. The apparatus according to supplement 19, wherein, the RRC signaling reconfigures a spatial relationship parameter with which at least one configured PUCCH resource is associated.

Supplement 21. A signal reception apparatus, including:
a receiving unit configured to, after a period of time of transmitting a downlink signal related to beam failure recovery and before transmitting activation signaling or reconfiguration signaling or applying activation signaling or reconfiguration signaling, receive an uplink signal in a first cell according to spatial information on receiving uplink signal related to beam failure recovery or transmitting a downlink reference signal.

Supplement 22. The apparatus according to supplement 21, wherein, when a second cell where the uplink signal related to beam failure recovery is received is the same cell as the first cell, the receiving unit receives the uplink signal in the first cell by using the spatial information on receiving uplink signal related to beam failure recovery.

Supplement 23. The apparatus according to supplement 21 or 22, wherein, when the second cell where the uplink signal related to beam failure recovery is received is the same cell as the first cell, the receiving unit receives the uplink signal in the first cell by using the spatial information on transmitting the downlink reference signal.

Supplement 24. The apparatus according to supplement 21, wherein, the downlink signal related to beam failure recovery is a beam failure recovery response and/or downlink data information scheduled by a beam failure recovery response.

Supplement 25. The apparatus according to supplement 24, wherein, the beam failure recovery response is downlink control information (DCI) transmitted in a search space provided by a higher layer parameter and scrambled by a cell radio network temporary identifier (C-RNTI) or a modulation and coding scheme cell radio network temporary identifier (MCS-C-RNTI).

Supplement 26. The apparatus according to supplement 25, wherein, the higher layer parameter is configured by radio resource control (RRC) signaling, and/or
the higher layer parameter is used for configuring a search space set transmitting a beam failure recovery random access response (BFR RAR).

Supplement 27. The apparatus according to supplement 21, wherein, the period of time satisfies at least one of the following:
the period of time is a preset number of symbols, or slots, or milliseconds;
a length of the period of time is configured by higher layer signaling;
the length of the period of time is related to a subcarrier spacing (SC S); and
the length of the period of time is related to a UE capability.

Supplement 28. The apparatus according to supplement 21, wherein, the uplink signal related to beam failure recovery is at least one of the following:
a beam failure recovery request;
physical random access channel (PRACH) reception for link failure recovery; and
physical random access channel (PRACH) reception associated with the downlink signal related to beam failure recovery.

Supplement 29. The apparatus according to supplement 21 or 28, wherein, the uplink signal related to beam failure recovery is configured by a higher layer parameter.

Supplement 30. The apparatus according to supplement 29, wherein, the higher layer parameter is borne by radio resource control (RRC) signaling, and/or
the higher layer parameter is used for configuring a resource receiving the uplink signal related to beam failure recovery specific for beam failure recovery (BFR).

Supplement 31. The apparatus according to supplement 21, wherein, the downlink reference signal is a downlink reference signal of the first cell, and/or
an index of the downlink reference signal is provided by signaling of a media access control (MAC) layer.

Supplement 32. The apparatus according to supplement 31, wherein, the index of the downlink reference signal is selected by the MAC layer from a higher layer parameter.

Supplement 33. The apparatus according to supplement 21, wherein, the first cell is at least one of the following cells:
a cell where the uplink signal related to beam failure recovery is received;

a cell where a random process to which transmission of the uplink signal related to beam failure recovery corresponds is initiated;

a cell where configuration information on the random process to which transmission of the uplink signal related to beam failure recovery corresponds is located;

a cell where the downlink signal related to beam failure recovery is transmitted; and at least one activated cell or all activated cells; wherein the activated cell refers to a cell activated by a network device for a terminal equipment via indication signaling.

Supplement 34. The apparatus according to supplement 33, wherein, the uplink signal in the first cell is an uplink signal received on a physical uplink control channel (PUCCH) and/or an uplink signal received on a physical uplink shared channel (PUSCH).

Supplement 35. The apparatus according to supplement 34, wherein, the uplink signal received on the physical uplink control channel is acknowledgement information used for bearing a downlink signal scheduled by first control information.

Supplement 36. The apparatus according to supplement 35, wherein, a search space with which the first control information is associated is identical to a search space with which the downlink signal related to beam failure recovery is associated.

Supplement 37. The apparatus according to supplement 21, wherein, the activation signaling is at least one of the following:

activation signaling of an MAC layer;

signaling indicating antenna panel switch of a terminal equipment indicated by the network device; and activation signaling of which a target cell is the first cell.

Supplement 38. The apparatus according to supplement 37, wherein, the activation signaling of the MAC layer is used for indicating spatial information to which reception of a PUCCH resource corresponds.

Supplement 39. The apparatus according to supplement 21, wherein, the reconfiguration signaling is at least one of the following:

RRC signaling;

reconfiguration signaling related to an antenna panel of a terminal equipment indicated by the network device; and reconfiguration signaling of which a target cell is the first cell.

Supplement 40. The apparatus according to supplement 39, wherein, the RRC signaling reconfigures a spatial relationship parameter with which at least one configured PUCCH resource is associated.

Supplement 41. A terminal equipment, including the apparatus as described in any one of supplements 1-20.

Supplement 42. A network device, including the apparatus as described in any one of supplements 21-40.

Supplement 43. A communication system, including the terminal equipment as described in supplement 41 and/or the network device as described in supplement 42.

Supplement 44. A signal transmission method, including:

after a period of time of receiving a downlink signal related to beam failure recovery and before receiving or applying activation signaling or reconfiguration signaling, transmitting an uplink signal in a first cell by a terminal equipment by using a spatial domain transmission filter identical to a spatial domain transmission filter transmitting an uplink signal related to beam failure recovery or receiving a downlink reference signal.

Supplement 45. The method according to supplement 44, wherein the transmitting an uplink signal in a first cell by using a spatial domain transmission filter identical to a spatial domain transmission filter transmitting an uplink signal related to beam failure recovery or receiving a downlink reference signal includes:

when a second cell where the uplink signal related to beam failure recovery is transmitted is the same cell as the first cell, transmitting the uplink signal in the first cell by using the spatial domain transmission filter identical to the spatial domain transmission filter transmitting the uplink signal related to beam failure recovery.

Supplement 46. The method according to supplement 44 or 45, wherein the transmitting an uplink signal in a first cell by using a spatial domain transmission filter identical to a spatial domain transmission filter transmitting an uplink signal related to beam failure recovery or receiving a downlink reference signal includes:

when the second cell where the uplink signal related to beam failure recovery is transmitted is a different cell from the first cell, transmitting the uplink signal in the first cell by using the spatial domain transmission filter identical to the spatial domain transmission filter receiving the downlink reference signal.

Supplement 47. The method according to supplement 44, wherein, the downlink signal related to beam failure recovery is a beam failure recovery response and/or downlink data information scheduled by a beam failure recovery response.

Supplement 48. The method according to supplement 47, wherein, the beam failure recovery response is downlink control information (DCI) received in a search space provided by a higher layer parameter and scrambled by a cell radio network temporary identifier (C-RNTI) or a modulation and coding scheme cell radio network temporary identifier (MCS-C-RNTI).

Supplement 49. The method according to supplement 48, wherein, the higher layer parameter is configured by radio resource control (RRC) signaling, and/or the higher layer parameter is used for configuring a search space set receiving a beam failure recovery random access response (BFR RAR).

Supplement 50. The method according to supplement 44, wherein, the period of time satisfies at least one of the following:

the period of time is a preset number of symbols, or slots, or milliseconds;

a length of the period of time is configured by higher layer signaling;

the length of the period of time is related to a subcarrier spacing (SC S); and the length of the period of time is related to a UE capability.

Supplement 51. The method according to supplement 44, wherein,
the uplink signal related to beam failure recovery is at least one of the following:
a beam failure recovery request;
physical random access channel (PRACH) transmission for link failure recovery; and
physical random access channel (PRACH) transmission associated with the downlink signal related to beam failure recovery.

Supplement 52. The method according to supplement 44 or 51, wherein,
the uplink signal related to beam failure recovery is configured by a higher layer parameter.

Supplement 53. The method according to supplement 52, wherein,
the higher layer parameter is borne by radio resource control (RRC) signaling, and/or
the higher layer parameter is used for configuring a resource transmitting the uplink signal related to beam failure recovery specific for beam failure recovery (BFR).

Supplement 54. The method according to supplement 44, wherein,
the downlink reference signal is a downlink reference signal of the first cell, and/or
an index of the downlink reference signal is provided by signaling of a media access control (MAC) layer.

Supplement 55. The method according to supplement 54, wherein,
the index of the downlink reference signal is selected by the MAC layer from a higher layer parameter.

Supplement 56. The method according to supplement 44, wherein,
the first cell is at least one of the following cells:
a cell where the uplink signal related to beam failure recovery is transmitted;
a cell where a random process to which transmission of the uplink signal related to beam failure recovery corresponds is initiated;
a cell where configuration information on the random process to which transmission of the uplink signal related to beam failure recovery corresponds is located;
a cell where the downlink signal related to beam failure recovery is received; and
at least one activated cell or all activated cells; wherein, the activated cell refers to a cell activated by a network device for a terminal equipment via indication signaling.

Supplement 57. The method according to supplement 56, wherein,
the uplink signal in the first cell is an uplink signal transmitted on a physical uplink control channel (PUCCH) and/or an uplink signal transmitted on a physical uplink shared channel (PUSCH).

Supplement 58. The method according to supplement 57, wherein,
the uplink signal transmitted on the physical uplink control channel is acknowledgement information used for bearing a downlink signal scheduled by first control information.

Supplement 59. The method according to supplement 58, wherein,
a search space with which the first control information is associated is identical to a search space with which the downlink signal related to beam failure recovery is associated.

Supplement 60. The method according to supplement 44, wherein,
the activation signaling is at least one of the following:
activation signaling of an MAC layer;
signaling indicating antenna panel switch of a terminal equipment; and
activation signaling of which a target cell is the first cell.

Supplement 61. The method according to supplement 60, wherein,
the activation signaling of the MAC layer is used for indicating a spatial domain transmission filter to which transmission of a PUCCH resource corresponds.

Supplement 62. The method according to supplement 44, wherein,
the reconfiguration signaling is at least one of the following:
RRC signaling;
reconfiguration signaling related to an antenna panel of a terminal equipment; and
reconfiguration signaling of which a target cell is the first cell.

Supplement 63. The method according to supplement 62, wherein,
the RRC signaling reconfigures a spatial relationship parameter with which at least one configured PUCCH resource is associated.

Supplement 64. A signal reception method, including:
after a period of time of transmitting a downlink signal related to beam failure recovery and before transmitting activation signaling or reconfiguration signaling or applying activation signaling or reconfiguration signaling, receiving an uplink signal in a first cell by a network device according to spatial information on receiving uplink signal related to beam failure recovery or transmitting a downlink reference signal.

Supplement 65. The method according to supplement 64, wherein the receiving an uplink signal in a first cell according to spatial information on receiving uplink signal related to beam failure recovery or transmitting a downlink reference signal includes:
when a second cell where the uplink signal related to beam failure recovery is received is the same cell as the first cell, receiving the uplink signal in the first cell according to the spatial information on receiving uplink signal related to beam failure recovery.

Supplement 66. The method according to supplement 64 or 65, wherein the receiving an uplink signal in a first cell according to spatial information on receiving uplink signal related to beam failure recovery or transmitting a downlink reference signal includes:
when the second cell where the uplink signal related to beam failure recovery is received is the same cell as the first cell, receiving the uplink signal in the first cell according to the spatial information on transmitting the downlink reference signal.

Supplement 67. The method according to supplement 64, wherein,
the downlink signal related to beam failure recovery is a beam failure recovery response and/or downlink data information scheduled by a beam failure recovery response.

Supplement 68. The method according to supplement 67, wherein,
the beam failure recovery response is downlink control information (DCI) transmitted in a search space provided by a higher layer parameter and scrambled by a cell radio network temporary identifier (C-RNTI) or a modulation and coding scheme cell radio network temporary identifier (MCS-C-RNTI).

Supplement 69. The method according to supplement 68, wherein,
the higher layer parameter is configured by radio resource control (RRC) signaling, and/or
the higher layer parameter is used for configuring a search space set transmitting a beam failure recovery random access response (BFR RAR).

Supplement 70. The method according to supplement 64, wherein,
the period of time satisfies at least one of the following:
the period of time is a preset number of symbols, or slots, or milliseconds;
a length of the period of time is configured by higher layer signaling;
the length of the period of time is related to a subcarrier spacing (SC S); and
the length of the period of time is related to a UE capability.

Supplement 71. The method according to supplement 64, wherein,
the uplink signal related to beam failure recovery is at least one of the following:
a beam failure recovery request;
physical random access channel (PRACH) reception for link failure recovery; and
physical random access channel (PRACH) reception associated with the downlink signal related to beam failure recovery.

Supplement 72. The method according to supplement 64 or 71, wherein,
the uplink signal related to beam failure recovery is configured by a higher layer parameter.

Supplement 73. The method according to supplement 72, wherein,
the higher layer parameter is borne by radio resource control (RRC) signaling, and/or
the higher layer parameter is used for configuring a resource receiving the uplink signal related to beam failure recovery specific for beam failure recovery (BFR).

Supplement 74. The method according to supplement 64, wherein,
the downlink reference signal is a downlink reference signal of the first cell, and/or
an index of the downlink reference signal is provided by signaling of a media access control (MAC) layer.

Supplement 75. The method according to supplement 74, wherein,
the index of the downlink reference signal is selected by the MAC layer from a higher layer parameter.

Supplement 76. The method according to supplement 64, wherein,
the first cell is one of the following cells:
a cell where the uplink signal related to beam failure recovery is received;
a cell where a random process to which transmission of the uplink signal related to beam failure recovery corresponds is initiated;
a cell where configuration information on the random process to which transmission of the uplink signal related to beam failure recovery corresponds is located;
a cell where the downlink signal related to beam failure recovery is transmitted; and
at least one activated cell or all activated cells; wherein the activated cell refers to a cell activated by a network device for a terminal equipment via indication signaling.

Supplement 77. The method according to supplement 76, wherein,
the uplink signal in the first cell is an uplink signal received on a physical uplink control channel (PUCCH) and/or an uplink signal received on a physical uplink shared channel (PUSCH).

Supplement 78. The method according to supplement 77, wherein,
the uplink signal received on the physical uplink control channel is acknowledgement information used for bearing a downlink signal scheduled by first control information.

Supplement 79. The method according to supplement 78, wherein,
a search space with which the first control information is associated is identical to a search space with which the downlink signal related to beam failure recovery is associated.

Supplement 80. The method according to supplement 64, wherein,
the activation signaling is at least one of the following:
activation signaling of an MAC layer;
signaling indicating antenna panel switch of a terminal equipment indicated by the network device; and
activation signaling of which a target cell is the first cell.

Supplement 81. The method according to supplement 80, wherein,
the activation signaling of the MAC layer is used for indicating spatial information to which reception of a PUCCH resource corresponds.

Supplement 82. The method according to supplement 64, wherein,
the reconfiguration signaling is at least one of the following:
RRC signaling;
reconfiguration signaling related to an antenna panel of a terminal equipment indicated by the network device; and
reconfiguration signaling of which a target cell is the first cell.

Supplement 83. The method according to supplement 82, wherein,
the RRC signaling reconfigures a spatial relationship parameter with which at least one configured PUCCH resource is associated.

What is claimed is:
1. A signal transmission apparatus, comprising:
a transmitter configured to, after a period of time of receiving a downlink signal related to beam failure recovery and before receiving or applying activation signaling or reconfiguration signaling, transmit an uplink signal in a first cell by using a spatial domain transmission filter identical to a spatial domain transmission filter transmitting an uplink signal related to beam failure recovery or receiving a downlink reference signal,
when a second cell where the uplink signal related to beam failure recovery is transmitted is a different cell from the first cell, the transmitter transmits the uplink signal in the first cell by using the spatial domain transmission filter identical to the spatial domain transmission filter receiving the downlink reference signal.

2. The apparatus according to claim 1, wherein, when the second cell where the uplink signal related to beam failure recovery is transmitted is the same cell as the first cell, by the transmitter transmits the uplink signal in the first cell by using the spatial domain transmission filter identical to the spatial domain transmission filter transmitting the uplink signal related to beam failure recovery.

3. The apparatus according to claim 1, wherein, the downlink signal related to beam failure recovery is at least one of the following: a beam failure recovery response and downlink data information scheduled by a beam failure recovery response.

4. The apparatus according to claim 3, wherein, the beam failure recovery response is downlink control information (DCI) received in a search space provided by a higher layer parameter and scrambled by a cell radio network temporary identifier (C-RNTI) or a modulation and coding scheme cell radio network temporary identifier (MCS-C-RNTI).

5. The apparatus according to claim 4, wherein, the higher layer parameter meets at least one of the following: the higher layer parameter is configured by radio resource control (RRC) signaling, and
the higher layer parameter is used for configuring a search space set receiving a beam failure recovery random access response (BFR RAR).

6. The apparatus according to claim 1, wherein, the period of time satisfies at least one of the following:
the period of time is a preset number of symbols, or slots, or milliseconds;
a length of the period of time is configured by higher layer signaling;
the length of the period of time is related to a subcarrier spacing (SCS); and
the length of the period of time is related to a terminal equipment (UE) capability.

7. The apparatus according to claim 1, wherein, the uplink signal related to beam failure recovery is at least one of the following:
a beam failure recovery request;
physical random access channel (PRACH) transmission for link failure recovery; and
physical random access channel (PRACH) transmission associated with the downlink signal related to beam failure recovery.

8. The apparatus according to claim 1, wherein, the uplink signal related to beam failure recovery is configured by a higher layer parameter.

9. The apparatus according to claim 8, wherein, the higher layer parameter meets at least one of the following:
the higher layer parameter is borne by radio resource control (RRC) signaling, and
the higher layer parameter is used for configuring a resource transmitting the uplink signal related to beam failure recovery specific for beam failure recovery (BFR).

10. The apparatus according to claim 1, wherein, the downlink reference signal meets at least one of the following:
the downlink reference signal is a downlink reference signal of the first cell, and
an index of the downlink reference signal is provided by signaling of a media access control (MAC) layer.

11. The apparatus according to claim 10, wherein, the index of the downlink reference signal is selected by the MAC layer from a higher layer parameter.

12. The apparatus according to claim 1, wherein, the first cell is at least one of the following cells:
a cell where the uplink signal related to beam failure recovery is transmitted;
a cell where a random process to which transmission of the uplink signal related to beam failure recovery corresponds is initiated;
a cell where configuration information on the random process to which transmission of the uplink signal related to beam failure recovery corresponds is located;
a cell where the downlink signal related to beam failure recovery is received; and
at least one activated cell or all activated cells, wherein the activated cell refers to a cell activated by a network device for a terminal equipment via indication signaling.

13. The apparatus according to claim 12, wherein, the uplink signal in the first cell is at least one of the following:
an uplink signal transmitted on a physical uplink control channel (PUCCH), and
an uplink signal transmitted on a physical uplink shared channel (PUSCH).

14. The apparatus according to claim 13, wherein, the uplink signal transmitted on the physical uplink control channel is acknowledgement information used for bearing a downlink signal scheduled by first control information.

15. The apparatus according to claim 1, wherein, the activation signaling is at least one of the following:
activation signaling of an MAC layer;
signaling indicating antenna panel switch of a terminal equipment; and
activation signaling of which a target cell is the first cell.

16. The apparatus according to claim 15, wherein, the activation signaling of the MAC layer is used for indicating a spatial domain transmission filter to which transmission of a PUCCH resource corresponds.

17. The apparatus according to claim 1, wherein, the reconfiguration signaling is at least one of the following:
RRC signaling;
reconfiguration signaling related to an antenna panel of a terminal equipment; and
reconfiguration signaling of which a target cell is the first cell.

18. The apparatus according to claim 17, wherein, the RRC signaling reconfigures a spatial relationship parameter with which at least one configured PUCCH resource is associated.

19. A signal reception apparatus, comprising:
a receiver configured to, after a period of time of transmitting a downlink signal related to beam failure recovery and before transmitting activation signaling or reconfiguration signaling or applying activation signaling or reconfiguration signaling, receive an uplink signal in a first cell according to spatial information on receiving uplink signal related to beam failure recovery or transmitting a downlink reference signal,
when a second cell where the uplink signal related to beam failure recovery is received is a different cell from the first cell, the receiver receives the uplink signal in the first cell according to spatial information on transmitting the downlink reference signal.

* * * * *